US012664169B2

(12) United States Patent (10) Patent No.: US 12,664,169 B2
Zeng et al. (45) Date of Patent: Jun. 23, 2026

(54) DATA SET SEMANTIC SIMILARITY CLUSTERING

(71) Applicant: Microsoft Technology Licensing, LLC, Redmond, WA (US)

(72) Inventors: Liangzhao Zeng, Cupertino, CA (US); Ketan P Duvedi, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/053,723

(22) Filed: Nov. 8, 2022

(65) Prior Publication Data

US 2024/0152522 A1 May 9, 2024

(51) Int. Cl.
G06F 16/2457 (2019.01)
G06F 16/28 (2019.01)

(52) U.S. Cl.
CPC ...... G06F 16/24578 (2019.01); G06F 16/285 (2019.01)

(58) Field of Classification Search
CPC .................... G06F 16/24578; G06F 16/285
See application file for complete search history.

(56) References Cited

U.S. PATENT DOCUMENTS

| | | | | |
|---|---|---|---|---|
| 10,229,186 B1 * | 3/2019 | Reiner | ................. | G06F 16/334 |
| 10,339,147 B1 * | 7/2019 | Barmes | ................. | G06N 5/046 |
| 11,675,816 B1 * | 6/2023 | Chandrasekharan | ... | G06F 11/30 707/737 |

| | | | | |
|---|---|---|---|---|
| 2019/0278777 A1 * | 9/2019 | Malik | ................. | G06F 16/9024 |
| 2019/0361890 A1 * | 11/2019 | Rogynskyy | ........... | G06F 16/273 |
| 2021/0042330 A1 * | 2/2021 | Bremer | ................. | G06N 20/00 |
| 2021/0173825 A1 * | 6/2021 | Lu | ...................... | G06F 16/2365 |
| 2022/0197914 A1 * | 6/2022 | Sodhi | ............... | G06F 16/24578 |
| 2022/0343250 A1 * | 10/2022 | Tremblay | ......... | G06Q 10/06316 |
| 2022/0374401 A1 * | 11/2022 | Oberhofer | ............ | G06F 16/285 |

OTHER PUBLICATIONS

Francq, P., "Similarity Measure," Paul Otlet Institute, retrieved from Internet: www.otlet-institute.org/wikics/Similarity_Measure.html#toc-Section-2, Feb. 17, 2016, 8 pages.
Zhang, S. et al., "Ad Hoc Table Retrieval using Semantic Similarity," Proceedings of the 2018 World Wide Web Conference (WWW '18), Track: Web Search and Mining, Apr. 2018, pp. 1553-1562.

* cited by examiner

*Primary Examiner* — Jensen Hu
(74) *Attorney, Agent, or Firm* — Nicholson De Vos Webster & Elliott LLP

(57) ABSTRACT

Embodiments of the system in include a method of clustering data sets based on the data set characteristics. A data repository stores a plurality of heterogeneous data sets. For a selected group of data sets (i) obtaining metadata; (ii) identifying upstream data sets; and (iii) extracting semantic features. The method further comprises clustering the plurality of data sets into one or more clusters based on similarity, wherein the similarity is determined based on a combination of the metadata, the upstream data sets, and the semantic features of the selected data sets. In one embodiment, the data sets are ranked within each cluster based on data set quality. The method enables the presenting of at least one cluster including one or more ranked data sets in response to a search query.

21 Claims, 8 Drawing Sheets

300

OBTAIN METADATA FROM
SELECTED DATA SETS
302

IDENTIFY UPSTREAM
DATA SETS USED BY THE
SELECTED DATA SETS
304

EXTRACT SEMANTIC
FEATURES FROM
SELECTED DATA SETS
306

CLUSTER DATA SETS
BASED ON SIMILARITY OF
UPSTREAM DATA SETS,
METADATA, AND
SEMANTIC FEATURES
308

MAKE CLUSTERED DATA
SETS AVAILABLE IN
RESPONSE TO SEARCH
QUERIES
310

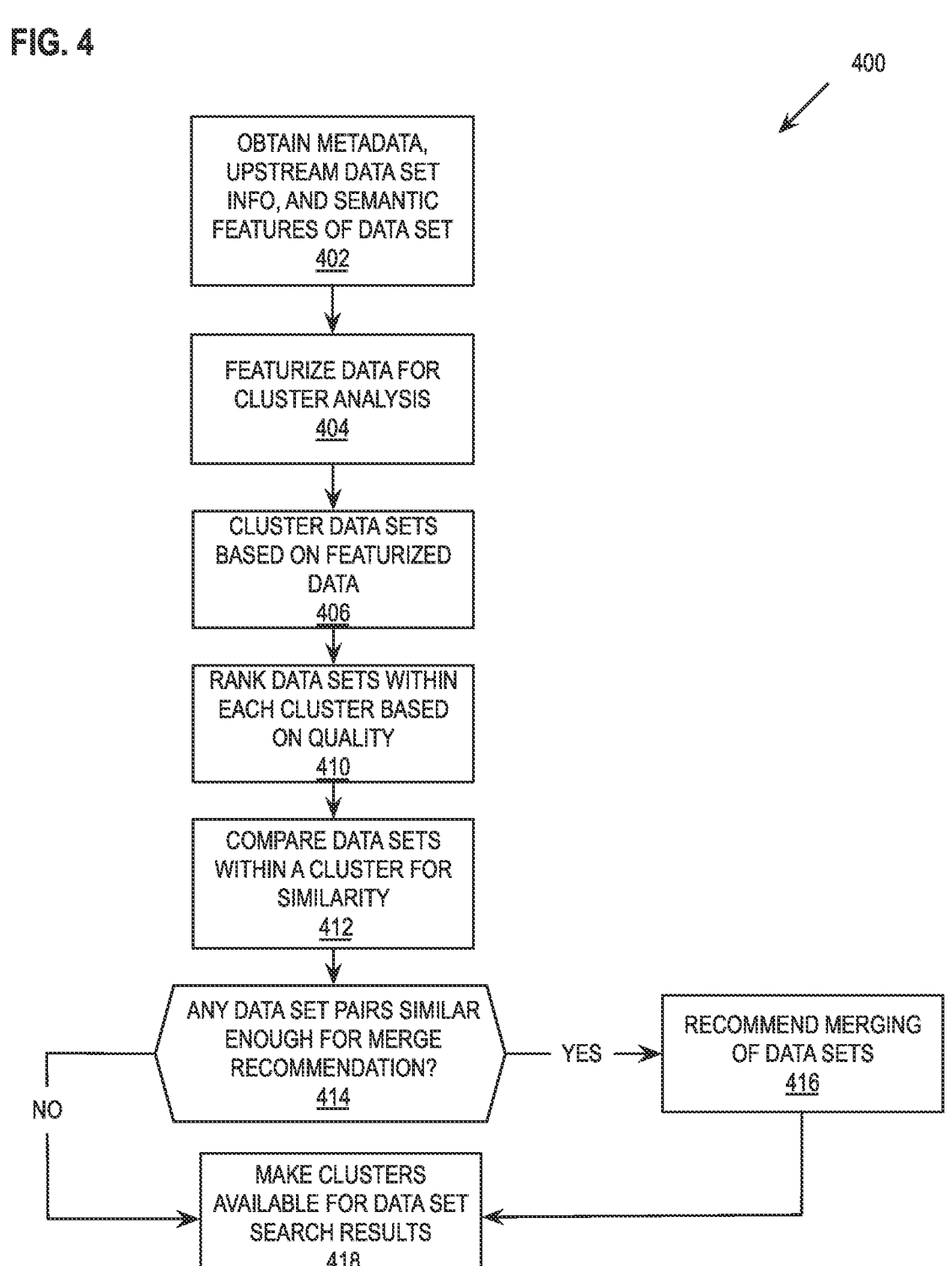

OBTAIN METADATA,
UPSTREAM DATA SET
INFO, AND SEMANTIC
FEATURES OF DATA SET
402

FEATURIZE DATA FOR
CLUSTER ANALYSIS
404

CLUSTER DATA SETS
BASED ON FEATURIZED
DATA
406

RANK DATA SETS WITHIN
EACH CLUSTER BASED
ON QUALITY
410

COMPARE DATA SETS
WITHIN A CLUSTER FOR
SIMILARITY
412

ANY DATA SET PAIRS SIMILAR
ENOUGH FOR MERGE
RECOMMENDATION?
414

NO

YES →

RECOMMEND MERGING
OF DATA SETS
416

MAKE CLUSTERS
AVAILABLE FOR DATA SET
SEARCH RESULTS
418

Figure 5:
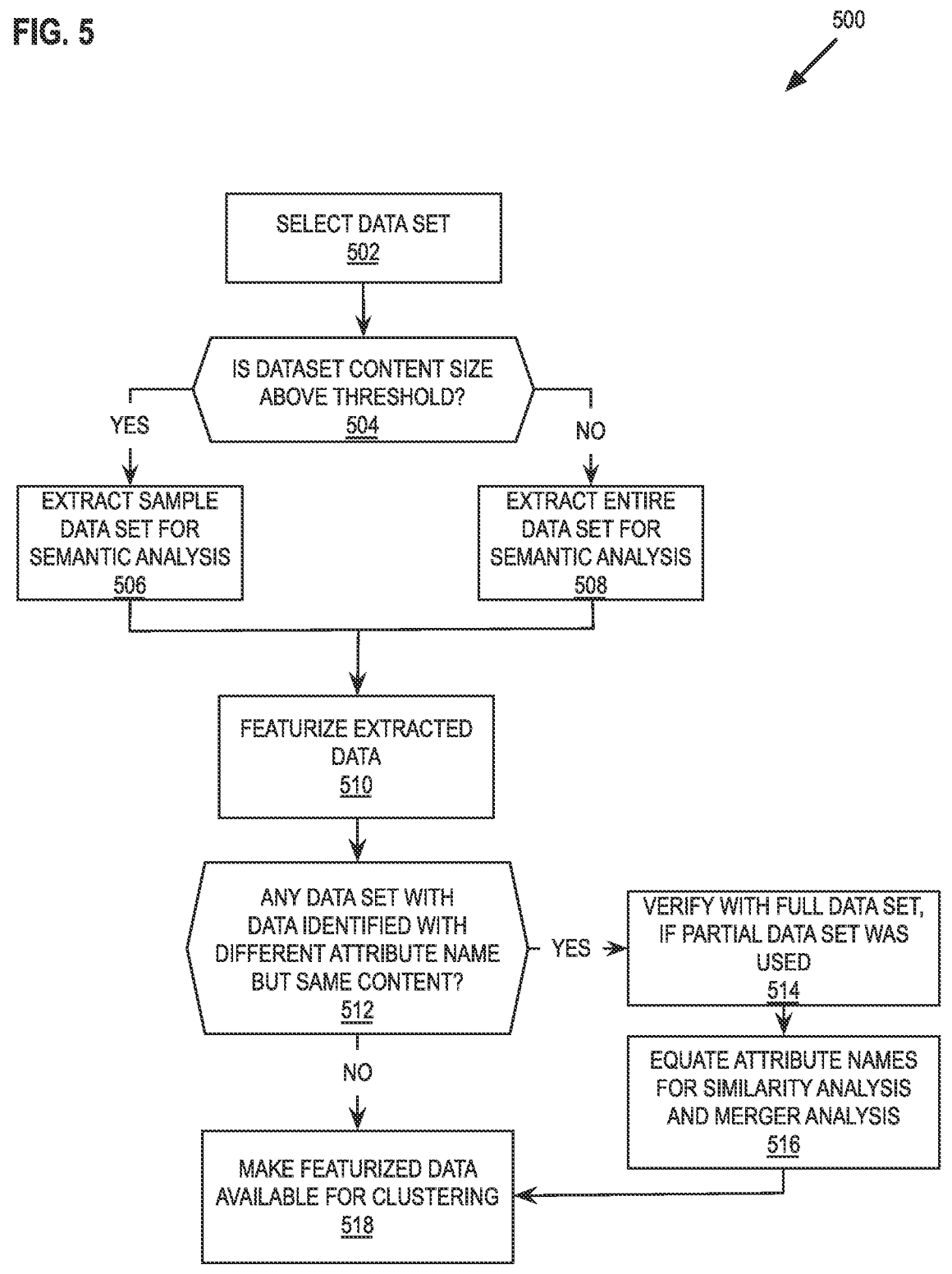

SELECT DATA SET
502

IS DATASET CONTENT SIZE
ABOVE THRESHOLD?
504

YES

NO

EXTRACT SAMPLE
DATA SET FOR
SEMANTIC ANALYSIS
506

EXTRACT ENTIRE
DATA SET FOR
SEMANTIC ANALYSIS
508

FEATURIZE EXTRACTED
DATA
510

ANY DATA SET WITH
DATA IDENTIFIED WITH
DIFFERENT ATTRIBUTE NAME
BUT SAME CONTENT?
512

YES

VERIFY WITH FULL DATA SET,
IF PARTIAL DATA SET WAS
USED
514

NO

EQUATE ATTRIBUTE NAMES
FOR SIMILARITY ANALYSIS
AND MERGER ANALYSIS
516

MAKE FEATURIZED DATA
AVAILABLE FOR CLUSTERING
518

600

<Search Terms>

SEARCH RESULTS
* Cluster A (keywords)
  * Data Set 1 (stability rating, update frequency)
  * Data Set 2 (stability rating, update frequency)
  * Data Set 3 (stability rating, update frequency)

* Cluster B (keywords)
  * Data Set 4 (stability rating, update frequency)
  * Data Set 5 (stability rating, update frequency)
  * Data Set 6 (stability rating, update frequency)
  * Data Set 7 (stability rating, update frequency)

The items in each cluster are ranked by quality metrics.

DATA SET SEMANTIC SIMILARITY CLUSTERING

TECHNICAL FIELD

A technical field to which this disclosure relates is data storage systems. Other technical fields to which this disclosure relates are the creation and maintenance of data sets.

BACKGROUND

Companies often use many data sets for analysis and in workflows. A larger company may have tens of thousands of data sets stored in a data storage system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram of an example method 400 to cluster data sets for searches in accordance with some embodiments of the present disclosure.

FIG. 5 is a flow diagram of an example method 500 to create features for data set clustering in accordance with some embodiments of the present disclosure.

FIG. 7 is an example of a user interface to display clustered search results in accordance with some embodiments of the present disclosure.

DETAILED DESCRIPTION

Figure 1:
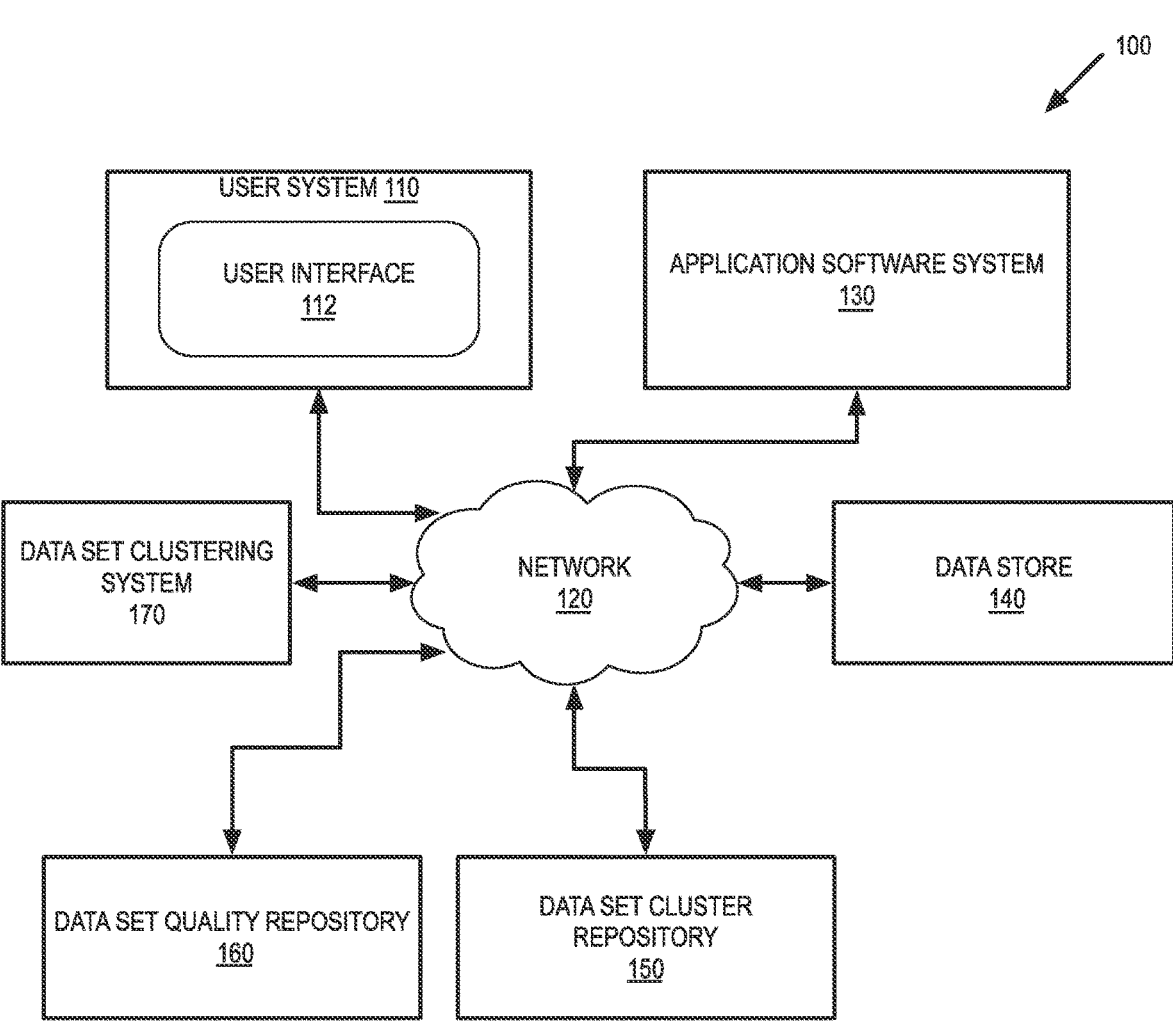
FIG. 1 illustrates an example computing system 100 that includes a data set clustering system 170 in accordance with some embodiments of the present disclosure.

Companies often use many data sets for analysis and in workflows. A larger company may have tens of thousands of data sets stored in a data storage system. Data sets may have similarities or even be duplicates of other data sets. Highly semantically similar or even duplicated data sets not only create unnecessary system overhead, and storage burden, but also create confusion when users try to choose the right data set for their projects. In some cases, the user may select a suboptimal data set, when there is a more complete, more frequently updated, or better quality data set with the same information available as well. Furthermore, users may create unnecessary data sets which are semantically similar or even duplicative of existing data sets, due to lack of discoverability of the existing data sets. A simple keyword-based search does not work well to enable data set discovery or selection from among similar or duplicated data sets.

In other systems, data sets in a data storage system are generally identified by users for inclusion in projects by using a key word search. However, keyword searches of a large number of data sets, some of which may be similar or duplicated, can lead to the wrong data set being selected for use. Additionally, keyword searches may not identify the correct data set, leading to the creation of further duplicative data sets. Furthermore, individual data sets are listed without indication of data set quality, and responses to the key word searches are listed in order based on the match to the key words, so for example a data set with fewer fields may be considered a better match for a search of a particular key word in one field, than a similar data set with more fields. This can result in the wrong, or inferior data set being used in projects.

Aspects of the present disclosure are directed to automatically clustering data sets in a data storage system, or data store or data pool, by similarity. The clustered data sets, in one embodiment, are then ranked. The ranking, in one embodiment, may be based on data set quality. Optionally, duplicates or data sets that are substantially similar may be identified, and deduplicated. In response to a search, the cluster of data sets is presented, in ranked order.

A collection of data received from a data source is referred to as a data set. Data in a data set share the same characteristics, or data metrics. The data set is stored in a data store, or data pool, which may include any type of storage including a database, a distributed database, memory, or any other storage. The data set clustering tool provides in one embodiment a tool for users creating projects or workflows. Workflow may refer to any computer process that creates and/or uses one or more data sets. Examples of workflows are computer processes that create recommendations, such as job recommendations and connection recommendations, provide data analytics, or otherwise utilize data sets, or create data sets.

Aspects of the disclosed technologies are designed to handle a large number of data sets and a data volume of terabytes of data. The disclosed technologies are designed to regularly receive new data sets, cluster them, generate data set quality metrics for the data sets, and use the data set quality metrics to rank the data sets within the clusters. In one embodiment, the disclosed technologies are capable of being utilized with a data store that has exabytes of data from hundreds or thousands of different data sources.

FIG. 1 illustrates an example computing system 100 that includes a data set clustering system 170 in accordance with some embodiments of the present disclosure.

In the embodiment of FIG. 1, computing system 100 includes a user system 110, a network 120, an application software system 130, a data store 140, a data set clustering system 170, a data set cluster repository 150, and a data set quality repository 160.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130. For simplicity, the present application will use as an example a social application system. Social application systems include but are not limited to connections network software, such as professional and/or general social media platforms, and systems that are or are not based on connections network software, such as digital content distribution services, general-purpose search engines, job search software, recruiter search software, sales assistance software, advertising software, learning and education software, or any combination of any of the foregoing. However, the present system can be used with any application that utilizes large data sets.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Data store 140 is a data repository. Data store 140 stores a plurality of heterogeneous data sets. Heterogeneous data sets include data sets that have different content, schemas, delivery frequencies, and times, and/or other differentiators. The data sets can be from different providers, e.g., various third parties.

The data may be received from heterogeneous external data sources, which include different systems. The systems can be within the same company. In some embodiments, the systems generating the data may be running on the same computing system 100. But the data source is considered external, in one embodiment, when it originates outside the data store 140.

In the social application system example provided, the heterogeneous data sources for example can include data sources of information about user social connections, data sources of information indicating user posts on the social application, data sources that collect user interactions on third party websites, such as media sites that are affiliated with the social application system. Some of these data sets are generated by the social application. However, they would still be considered external data sources because they are not generated by the data repository management system of computer system 100. The data sets provided as examples are heterogeneous because they are provided on a different schedule, for different data, with different data schemas. However, any one of those differentiators is sufficient to consider data sets heterogeneous.

In one embodiment, there can be different heterogeneous external data sources which provide different types, quantities, and frequencies of data to the data store 140. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Application software system 130 is any type of application software system that includes or utilizes functionality provided by the data set clustering system 170. Examples of application software system 130 include but are not limited to connections network software, such as social media platforms, and systems that are or are not based on connections network software, such as general-purpose search engines, job search software, recruiter search software, sales assistance software, advertising software, learning and education software, or any combination of any of the foregoing.

The application software system 130 can include a system that provides data to network software such as social media platforms or systems.

While not specifically shown, it should be understood that any of user system 110, application software system 130, data store 140, data set clustering system 170, data set cluster repository 150, and data set quality repository 160 include an interface embodied as computer programming code stored in computer memory that when executed causes a computing device to enable bidirectional communication with any other of user system 110, application software system 130, data store 140, data set clustering system 170, data set cluster repository 150, and data set quality repository 160 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, data set clustering system 170, data set cluster repository 150, and data set quality repository 160 is implemented using at least one computing device that is communicatively coupled to electronic communications network 120. Any of user system 110, application software system 130, data store 140, data set clustering system 170, data set cluster repository 150, and data set quality repository 160 can be bidirectionally communicatively coupled by network 120, in some embodiments. User system 110 as well as one or more different user systems (not shown) can be bidirectionally communicatively coupled to application software system 130.

A typical user of user system 110 can be an administrator or end user of application software system 130, data set clustering system 170, data set cluster repository 150, and data set quality repository 160. User system 110 is configured to communicate bidirectionally with any of application software system 130, data store 140, data set clustering system 170, data set cluster repository 150, and data set quality repository 160 over network 120, in one embodiment. In another embodiment, the user system 110 communicates with application software system 130 and data set clustering system 170, but does not directly communicate with the data set quality repository 160 or data set cluster repository 150.

The features and functionality of user system 110, application software system 130, data store 140, data set clustering system 170, data set cluster repository 150, and data set quality repository 160 are implemented using computer software, hardware, or software and hardware, and can include combinations of automated functionality, data structures, and digital data, which are represented schematically in the figures. User system 110, application software system 130, data store 140, data set clustering system 170, data set cluster repository 150, and data set quality repository 160 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links, as well as wired networks, or computer busses when the system 100 is implemented on a single computer system. The various elements can be connected with different networks and/or types of networks.

Figure 8:
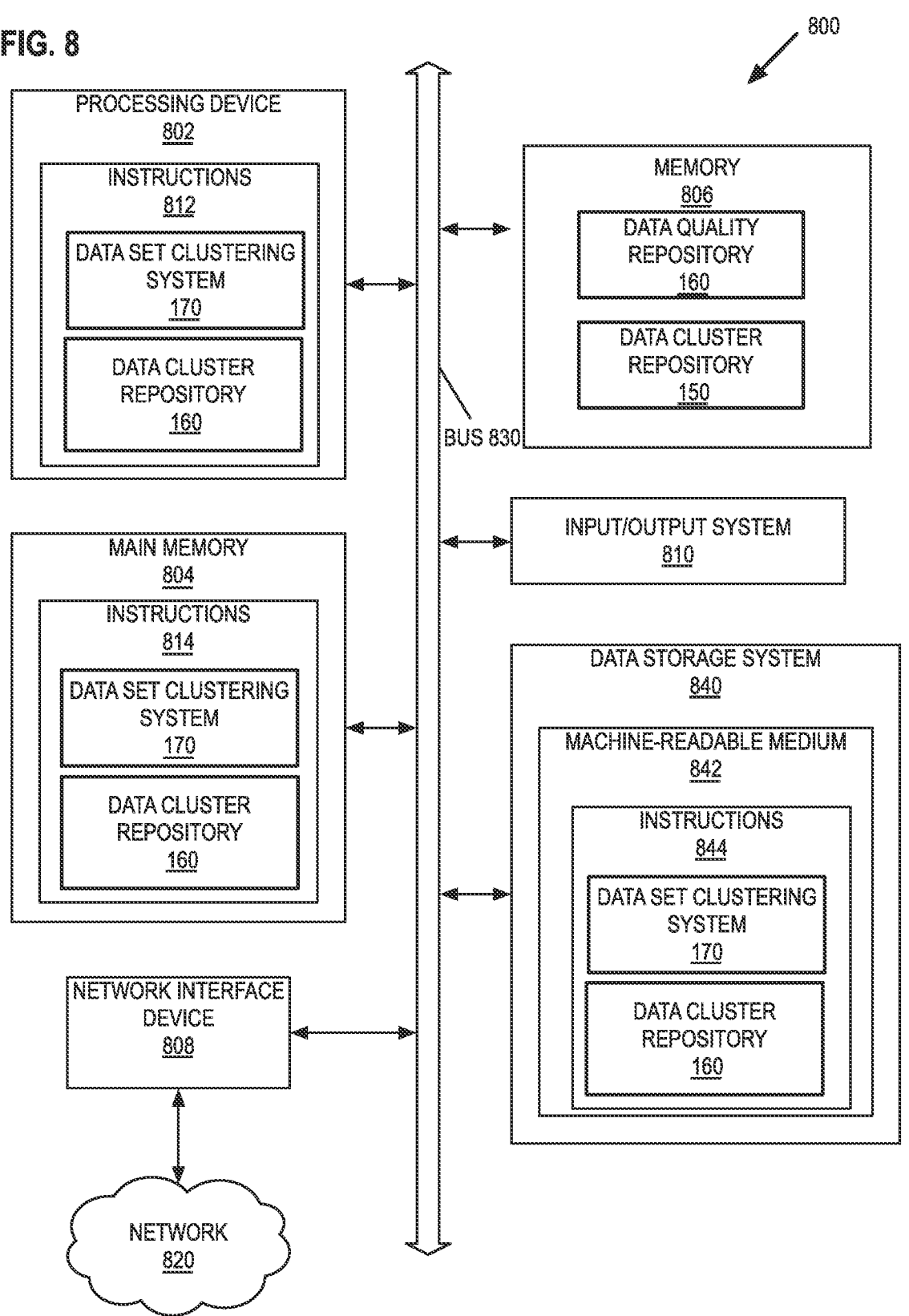
FIG. 8 is a block diagram of an example computer system in which embodiments of the present disclosure can operate.

The computing system 100 includes a data set clustering system 170 that cluster data sets from external data sources, and a data set cluster repository 150 which can be queried by user systems 110 associated with data consumers. In some embodiments, the application software system 130 includes at least a portion of the data set clustering system 170. As shown in FIG. 8, the data set clustering system 170 can be implemented as instructions stored in a memory, and a processing device 802 can be configured to execute the instructions stored in the memory to perform the operations described herein.

The data set clustering system 170 can automatically cluster heterogeneous data sets, and rank them based on the data set quality from data set quality repository 160.

The data set cluster repository 150 stores the clustering information for the data sets. The disclosed technologies can be described with reference to the large number of types of data utilized in a social graph application such as a professional social network application. The disclosed technologies are not limited to data associated with social graph applications but can be used to perform data set quality validation more generally. The disclosed technologies can be used by many different types of network-based applications which consume large heterogeneous data sets. The data set quality repository 160 stores metadata generated by a data set quality evaluation system.

Further details with regard to the operations of the data set clustering system 170 and the data set cluster repository 150 are described below.

Figure 2:
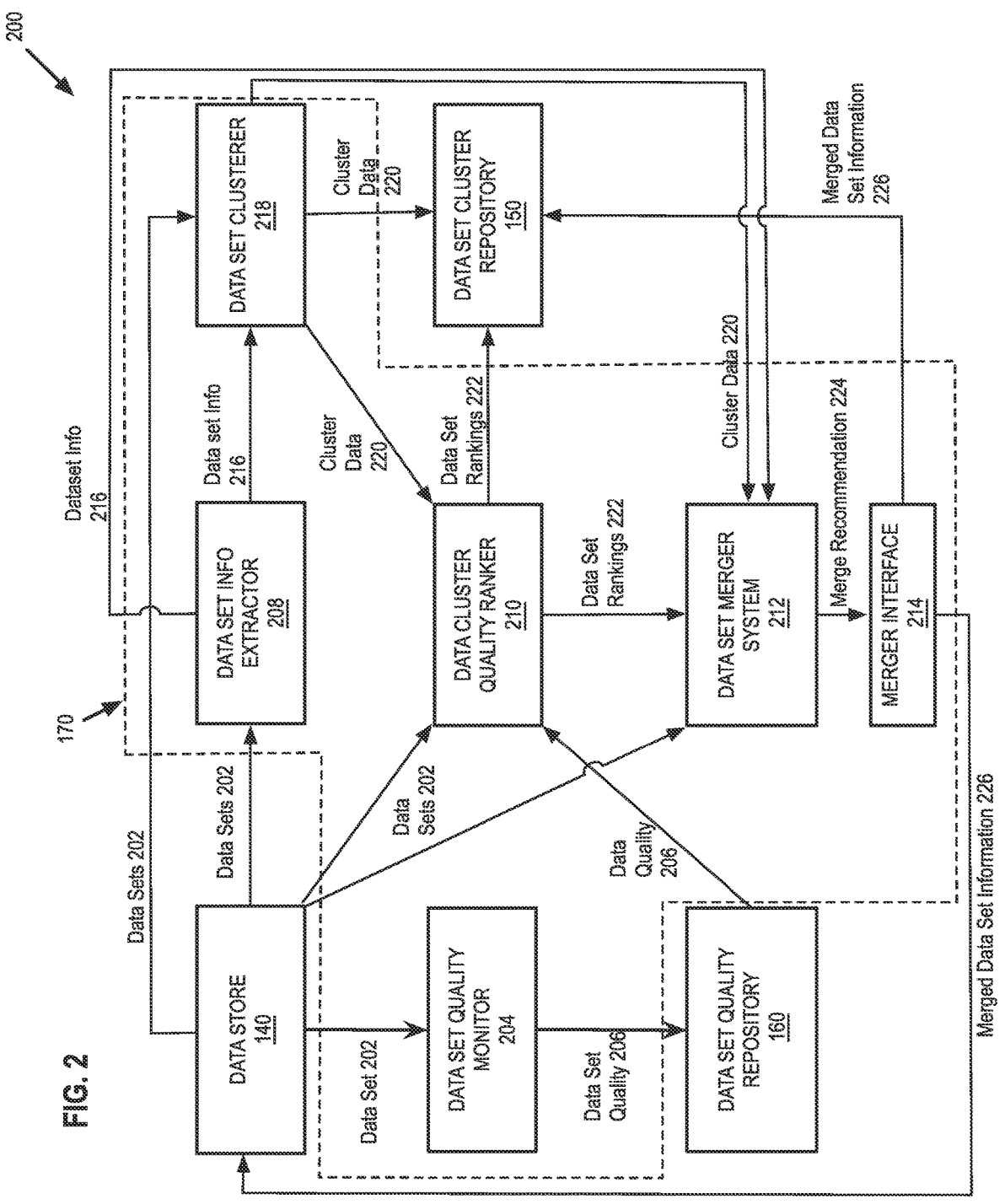
FIG. 2 shows a system 200 to process data sets in accordance with some embodiments of the present disclosure.

FIG. 2 shows a system 200 to process data sets in accordance with some embodiments of the present disclosure. FIG. 2 illustrates one embodiment of the data set clustering system 170, and how data is passed between the elements within the data set clustering system 170 and storage elements including the data store 140, data set cluster repository 150, and the data set quality repository 160.

The data store 140 stores data sets from a plurality of sources. The data store 140 provides data set data to the data set information extractor 208, the data set clustering system 170, and the data set quality monitor 204.

The data set information extractor 208 extracts the metadata, semantic features, and upstream data set(s) if any for each data set, to create data set info 216 associated with the data set. This data set info 216 is provided to data set clustering system 170.

The data set information extractor 208 parses the data set to identify data set inputs and outputs (I/O).

For example, in one embodiment, a data set may have the format:

```
datasetIOLog(flowName, flowExecutionId, IOoperation,
datasetName, timestamp)
That may look as follows:
('Jobs', 12345, 'read', 'Jobs_postings', '2022-04-10 00:01:45')
```

This indicates that the data set named "Jobs" with the execution ID "12345" read the data set "Jobs postings" at a particular date and time. However, the data set "Jobs_postings" may have other data sets which are related to it. For example, the following information may be in the log of the workflow that generates the data set Jobs_postings:

```
('Jobs_creation', 54321, 'write', 'Jobs_postings', '2022-04-09
00:01:45')
```

This indicates that the workflow named "Jobs_creation" with the execution ID "54321" wrote to the data set "Jobs postings" at a particular date and time.

One implementation of finding the first "hop" of upstream data sets for a given workflow may be implemented as:

```
Select      distinct datasetName
From        datasetIOLog
Where       IOperation = 'read' and flowName = 'f'
            and datasetName not in {
            Select datasetName
            From datasetIOLog
            Where IOoperation = 'write'
```

The data set information extractor 208 recursively searches one hop upstream data sets, to discover all of the applicable data sets used directly or indirectly by the data set. In one embodiment, the search extends for N iterations. In one embodiment, the number of iterations may be set. In one embodiment, the system may iterate until no further upstream data sets that had not previously been identified are found. The data set info extractor sends data set information 216, which includes metadata, upstream data sets, and semantic features to the data set clustering system 170.

The data set clusterer 218 utilizes the data sets 202 and data set info 216 to cluster the data sets based on similarity. In one embodiment, K-means clustering is used. In one embodiment, the clustering is performed based on a combination of the metadata, upstream data sets, and semantic features extracted from the data sets. In one embodiment, the K-means clustering uses a combination of the data set information 216 to partition the data sets into k clusters. In one embodiment, K-medoids, CLARANS (Clustering Large Applications based on RANdomized Search), or other approaches may be used for clustering. In one embodiment, the set of features (metadata and/or semantic features) used for clustering may be specified by the user. In one embodiment, the default is to use all available metadata and semantic features. In one embodiment, the system may use all features and the user may alter the weighting of the features in the clustering, as will be discussed below.

Once the data set clusterer 218 creates the clusters, the cluster data 220 is stored in data set cluster repository 150. In one embodiment, data set cluster repository 150 stores the metadata which indicates the cluster for each data set. The data sets themselves remain stored in data store 140.

The cluster data 220 is also passed to data cluster quality ranker 210. The data cluster quality ranker 210 ranks the data sets within each cluster by data set quality. The data set quality information 206 is received by data cluster quality ranker 210 from data set quality repository 160.

Data set quality of one or more of the data sets 202 in the data store 140 is evaluated by data set quality monitor 204. Data set quality or data health in one embodiment is based on metadata quality and data content quality. Metadata quality includes arrival time, update frequency, number of columns, and raw data count, in one embodiment. Data content quality includes value nullability, entry duplication, and completeness, in one embodiment. In one embodiment, data set quality is rated for each aspect and a final data set quality is determined. The data set quality 206 is stored in data set quality repository 160.

The data cluster quality ranker 210 uses the data set quality 206 to rank data sets within each cluster. In one embodiment, the data sets are ranked from highest quality to lowest, and are assigned a position within the cluster based on those rankings.

The data set rankings 222 from data cluster quality ranker 210 are passed to data set cluster repository 150. The data set cluster repository 150 thus includes for each data set the identification of its cluster and the rank within the cluster. By storing the cluster and rank data in the data set cluster repository 150, separately from the underlying data sets, the system in one embodiment can re-cluster the data sets.

The data sets 202, data set rankings 222, data set info 216, and cluster data 220 are also provided to data set merger system 212, in one embodiment. The data set merger system 212 identifies data sets that are substantively overlapping, for potential merger. Data set merger system 212 recommends merging of duplicated data sets within clusters, based on a comparison of the data set info 216. In one embodiment, a merge recommendation 224 is generated when data sets are identical, e.g., they have the same metadata, semantic features, and identical upstream data set(s). In one embodiment, a merge recommendation 224 is generated when the data sets have a similarity above a certain threshold. In one embodiment, if a data set is a subset of another data set, the two data sets may be recommended for merging. In one embodiment, if a data set is a subset of another data set in the cluster, a merge recommendation is made. In one embodiment, the recommendation is to merge the subset into the superset. In one embodiment, if two data sets are identified for merging, one is selected as the retained data set and the other is flagged for deletion.

In one embodiment, if the data sets' semantic features are identical, the data set with the higher data set quality is recommended as the retained data set. Data set semantic features in one embodiment include the column labels and data types for the data set. The data set merger system 212 provides a merge recommendation 224 to a user. The merger in one embodiment must be approved by an authorized user. In one embodiment, the authorized user may authorize a data set merger via merger interface 214. Once data sets are merged, the merged data set information 226 is propagated to the data store 140 and the data set cluster repository 150, and the deleted data set and its clustering data are removed. In one embodiment, all workflows which rely on the deleted data set are updated to use the retained data set. In one embodiment, an alert may be sent out to anyone using the deleted data set. In one embodiment, the system may remove the deleted data set from the data store 140. In one embodiment, users of the deleted data set are notified that their workflow and processes should be updated to reference the retained data set. In one embodiment, the system may automatically replace references to the deleted data set in workflows with references to the retained data set.

Figure 3:
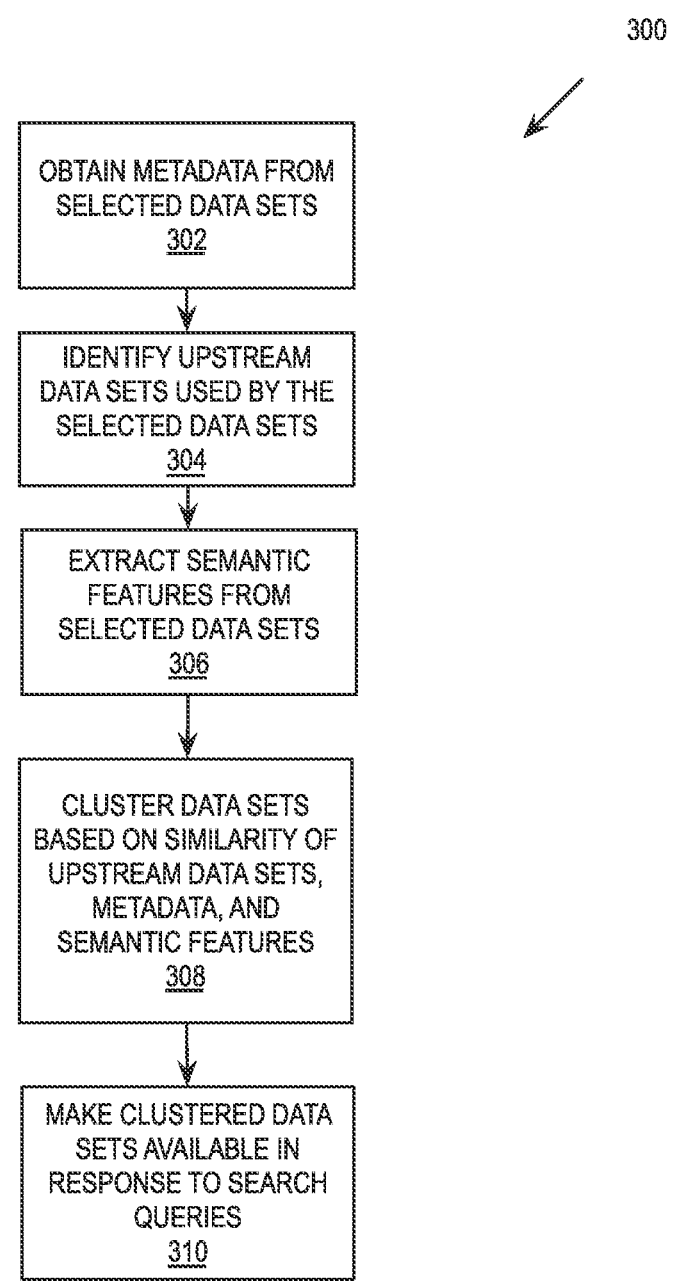
FIG. 3 is a flow diagram of an example method 300 to provide data set clustering in accordance with some embodiments of the present disclosure.

FIG. 3 is a flow diagram of an example method 300 to provide data set clustering in accordance with some embodiments of the present disclosure. In one embodiment, as new data sets are added to the repository, the system uses this process. In one embodiment, this process is initiated periodically to re-cluster the data sets in the repository. In one embodiment, reclustering may be triggered based on time, new data sets, or manually.

In one embodiment, a selected subset of the data sets are clustered. For example, the system may separately cluster data sets including certain column labels such as user data, and not include data sets which do not include user data. In one embodiment, a user may request a reclustering, based on certain constraints. The constraints, for example, may include upstream data sets, fields, etc. In one embodiment, the selected data sets include all data sets in the data repository.

At operation 302, metadata is obtained from selected data sets in a data repository. In one embodiment, the metadata includes a number of attributes, a list of attribute names, field types, and value constraints. In one embodiment, this data is stored in a repository.

At operation 304, upstream data sets are identified. An upstream data set, as discussed above, is a data set referenced in a workflow or other data set. In one embodiment, this data is stored in the repository.

At operation 306, semantic features are extracted from the data sets. The semantic features include the data features which may include the column labels and data types for each column and/or row, as well as the data contents of each column. In one embodiment, for a data set with a large number of entries, the data content may be sampled for semantic feature extraction. In one embodiment, simple random sampling is used. In one embodiment, stratified sampling is used, on a per column, or per data type basis. Other types of sampling to obtain a representative subset of data set content may be used.

At operation 308, the data sets are clustered based on similarity of upstream data sets, metadata, and semantic features. In one embodiment, the clustering utilizes a combination of all three data types for clustering. In one embodiment, the clustering initially uses upstream data sets, e.g., where the data comes from, and then clusters within data sets sharing the same parent data sources based on metadata. Finally, the semantic or content data is used.

At operation 310, the clustered data sets are made available in response to search queries. When a user enters a keyword search for a data set, rather than presenting a list of data sets, the system presents a cluster of data sets. This ensures that the data set being sought is easily found, and that the users select the most relevant data set of the available data sets. FIG. 7 is an example of a user interface 700 to display clustered search results in accordance with some embodiments of the present disclosure. The search terms are entered by the user, looking for a data set. In response, the search results presented include one or more clusters of data, each cluster, shown as Cluster A and Cluster B, including one or more data sets. In one embodiment, each cluster has associated keywords. In one embodiment, each data set within a cluster is ranked by quality metrics. In one embodiment, each data set has a rating that is displayed with the search results. In one embodiment, that rating is a stability rating, consistency of arrival time. In one embodiment, the rating is an update frequency, indicating how frequently the data set is updated. In one embodiment, the update frequency may be provided in hours/days/weeks.

In one embodiment, the operations 302, 304, and 306 of FIG. 3 are applied to each data set in the data repository. The clustering operation 308 is undertaken periodically. In one embodiment, the clustering may be re-done each time a new query is received, when there are any new data sets in the repository that were not previously clustered. In one embodiment, the clustering may be redone automatically whenever new data sets are received.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data set clustering system 170 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 4 is a flow diagram of an example method 400 to cluster data sets for searches in accordance with some embodiments of the present disclosure.

At operation 402, the metadata, upstream data set information, and semantic features of the data set are obtained. In one embodiment, the process described above with respect to operations 302, 304, and 306 is used to obtain this information.

At operation 404, the data is featurized for cluster analysis. Featurizing in one embodiment is converting the data into numerical values or vector values. Conversion into a vector or numerical value enables determination of the similarity between elements, for clustering. In one embodiment, for labels or other word-based elements, the word2vect algorithm is used for featurizing. The word2vect algorithm uses a neural network model to learn word associations. In word2vect, each distinct word is represented by a vector, and the vectors are chosen to capture the semantic and syntactic qualities of the word.

At operation 406, the data sets are clustered based on the featurized data. In one embodiment, the clustering is performed based on a combination of the metadata, upstream data sets, and semantic features extracted from the data sets. In one embodiment, a subset of features (metadata and/or semantic features) used for clustering may be specified by the user. In one embodiment, the user may alter the weighting of the features in the clustering.

At operation 410, the data sets are ranked within each cluster. The ranking is done based on data set quality. In one embodiment, the data set quality is separately calculated, and is based on metadata quality and data content quality. In one embodiment, metadata quality is defined by one or more of: arrival time, update frequency, number of columns, raw data count, etc. In one embodiment, data content quality is defined by one or more of: value nullability, entry duplication, completeness, etc. Value nullability is the ability for a value to be null, e.g., without value/undefined. Value duplication is duplicate content within the data set. Completeness indicates how much of the data set is populated. Each data set has a data set quality rating based on a combination of the metadata quality and the data content quality. The data sets within each cluster are ranked based on the data set quality, with the highest quality data being ranked, and thus displayed, at the top of the cluster.

At operation 412, the data sets within a cluster are compared for similarity. Sometimes, the data repository may include duplicated data sets, or substantially similar data sets. Substantially similar data sets, in one embodiment, are data sets which overlap above a threshold. In one embodiment, that threshold is 95% two-way overlap in data content between the two data sets, or 100% overlap in one direction, e.g., one data set is a subset of another.

At operation 414, the determination is made whether pairs of data sets are similar enough for a merge recommendation. In one embodiment, the system determines a percentage metadata match and a percentage semantic match between the data sets. If both are above the similarity threshold, a merge recommendation is generated. If no data sets are similar enough for a merge recommendation, at operation 418, the data set clusters are made available for data search results. Thus, when a user searches for data sets within the data repository, rather than presenting a long list of data sets which only indicate the percent overlap with the search query, the system presents the most relevant clusters, with the data sets within each cluster ordered by data set quality.

If any data set pair is sufficiently similar for a merge recommendation, at operation 416, a merge recommendation is sent. In one embodiment, merger decisions are left to human administrator. The system, in one embodiment, provides the comparison information, the relative quality information, and the merge recommendation to the human administrator. If the human administrator chooses to complete the merger, the retained data set remains in the data repository, while the deleted data set is removed. This reduces the volume of data in the data repository, and also makes it easier to find the best data set to use in workflows. The process then continues to operation 418, to make the data clusters available for searching.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data set clustering system 170 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 5 is a flow diagram of an example method 500 of performing the semantic extraction and data comparison. At operation 502, the data set is selected for this operation. In one embodiment, this occurs after the metadata is extracted from the data set.

At operation 504, the system determines whether the data set content size is above a threshold. In one embodiment, for large data sets instead of analyzing the entire data content a sample amount of data is extracted. In one embodiment, the threshold is more than few thousand entries, more than 10 columns, or a cumulative data size of thousand GBs.

If the data set size is above the threshold, at operation 506 a sample data set is extracted for semantic analysis. The sample data set in one embodiment, includes data from each of the rows and each of the columns of a database. In one embodiment, simple random sampling is used. In one embodiment, stratified sampling is used, on a per column, or per data type basis. Other types of sampling to obtain a representative sample of data in the data set may be used.

If the data set size is below the threshold, at operation 508, the entire data set is used for semantic analysis.

At operation 510, the extracted data is featurized. As discussed above, featurizing converts the raw data into a vector or numerical representation, for comparison.

At operation 512, the method determines whether there is another data set that has matching data identified with a different attribute name or field label. For example, the field label for names may be "user name" in one data set while the same data is labeled "customer name" in another data set. In one embodiment, a comparison of the featurized data across data sets enables a comparison of the data contents even if the metadata such as labeling is mismatched.

If a potential match is identified, at operation 514, the match is verified with the full data set information, if the comparison was based on a partial data set in one or both of the data sets, in one embodiment. If the verification confirms that the data content in a particular field is identical, at operation 516, the attribute names are equated. In one embodiment, the attribute names may be changed in a data set to match the other data set. This is useful in both clustering the data sets and merger analysis.

At operation 518, the featurized data, with the correct attribute names, is made available for clustering. As discussed above, the clustering associates data sets that have similar data content, based on a comparison of the featurized semantic data, as well as metadata, and upstream data sets.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data set clustering system 170 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 6:
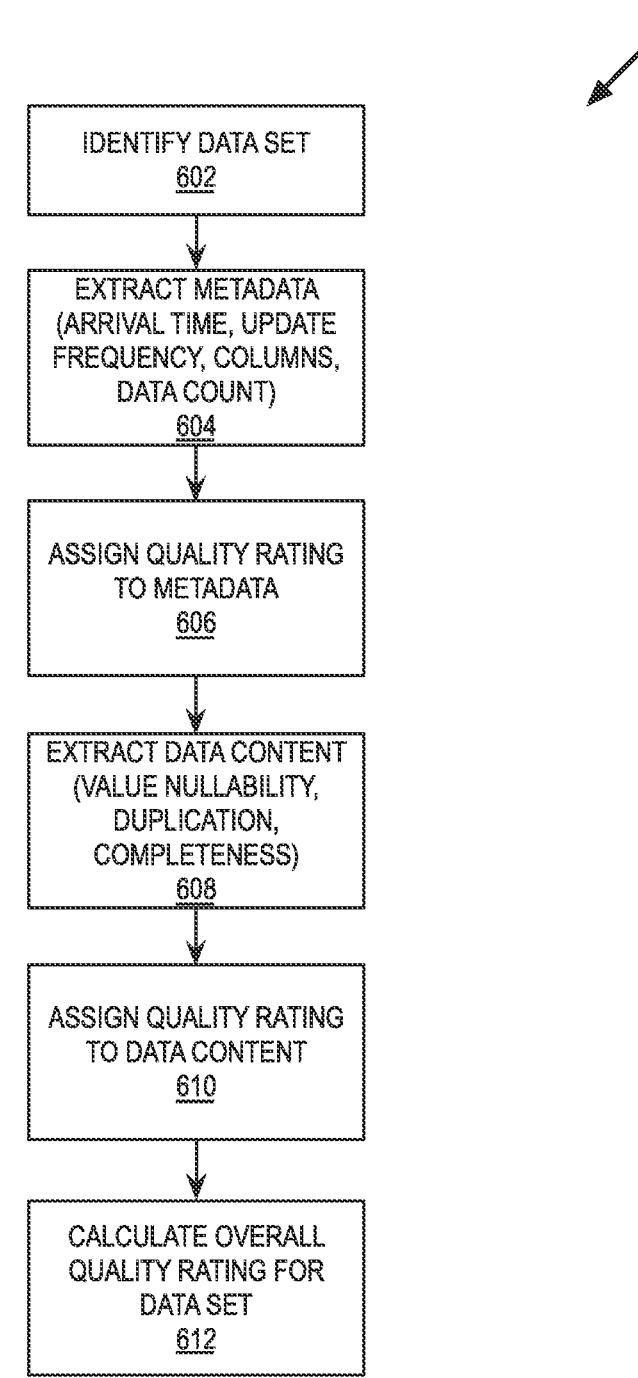
FIG. 6 is a flow diagram of an example method 600 to calculate a quality rating for a data set in accordance with some embodiments of the present disclosure.

FIG. 6 is a flow diagram of an example method 600 to calculate a quality rating for a data set in accordance with some embodiments of the present disclosure. The quality rating calculated by the method 600 is used in one embodiment for ranking the data sets, as described with respect to operation 410 of FIG. 4 and elsewhere.

At operation 602 a data set is identified. In one embodiment, this method is applied to each data set included in the clustering. In one embodiment, this may include all data sets in the data repository. However, as noted above, in one embodiment, a subset of data sets may be used in clustering. In one embodiment, for any data sets included in the clustering, the quality rating calculation described may be used.

At operation 604, the metadata is extracted. The metadata, as discussed above, may include one or more of arrival time, update frequency, number of columns, and data count. In one embodiment, at a minimum, the metadata includes update frequency and number of columns.

At operation 606, a quality rating is attached to the metadata, the metadata quality. In one embodiment, the quality rating may be between 0 and 100. In one embodiment, the rating is a cumulative rating based on one or more metadata elements evaluated.

In one embodiment, the metadata quality function is $$MQ(\text{Data Set}) = \sum_{i=1}^{n} W_i * S_i$$

where:

MQ is the metadata quality

W is the weight for the metadata type,

S is the rating for the metadata type, and i corresponds to of the metadata types.

In one embodiment, the rating may range between 0 and 100 for each quality element.

In one embodiment, for update frequency, the value may be 100 for hourly updates, 75 for updates every three hours, 50 for daily updates, and 25 for less frequent than daily updates.

In one embodiment, for arrival time, the value may be 100 for on-time updates, 75 for arrival within a two hour window of the updating time, and 50 for updates outside that window.

In one embodiment, for the number of columns, in one embodiment, the value may be 100 for the data set with the largest number of columns in the cluster, and decrease by an increment corresponding to the number of data sets, so the data set with the lowest number of columns is rated a 0.

Similarly, in one embodiment, for the data count, in one embodiment, the value may be 100 for the data set with the largest data count in the cluster, and decrease by an increment corresponding to the number of data sets, so the data set with the lowest data count is rated a 0.

Of course, these values may vary, and the gradations between values may be changed.

In one embodiment, the weighting factor is equal for each metadata type. In one embodiment, the weighting may be controlled by a user. For example, in one embodiment, a user may indicate that they value a particular metadata quality more highly than others. In that case, they may increase the weight for that metadata quality. Because the underlying rating is stored, the reweighting and re-sorting can be done immediately for that user.

At operation 608, the data content quality is extracted. In one embodiment, data content quality includes value nullability, value duplication, and completeness. Value nullability is the ability for a value to be null, e.g., without value/undefined. Value duplication is duplicate content within the data set. Completeness indicates how much of the data set is populated.

In one embodiment, the metadata quality function is $$DQ(\text{Data Set}) = \sum_{i=1}^{n} W_i * S_i$$

where:

DQ is the data set quality

W is the weight for the data type,

S is the rating for the data type, and i corresponds to of the data types.

In one embodiment, the rating may range between 0 and 100 for each data type. In one embodiment, for each of the data types, the rating depends on the ratio of the total number of rows/data entries to the number that is nullable/duplicated/blank. In one embodiment, the ratings is 100 for the data set with the fewest nullable/duplicated/blank data, and is decreased by an increment corresponding to the number of data sets with different numbers within the cluster.

In one embodiment, the weighting factor is equal for each data type. In one embodiment, the weighting may be controlled by a user. For example, in one embodiment, a user may indicate that they value a particular data set quality more highly than others. In that case, they may increase the weight for that data set quality. Because the underlying rating is stored, the reweighting and re-sorting can be done immediately for that user.

At operation 610, a quality rating is assigned to the data content, the data content quality. In one embodiment, the data content quality indicates the percentage of the content that is nullable, duplicated, or missing.

At block 612, an overall quality rating is calculated based on the metadata quality and the data content quality. The overall quality rating is stored, in one embodiment, in a data set quality repository. In one embodiment, each of the ratings that make the up quality rating are also stored, enabling recalculation with different weights, as discussed above. This information is used by the data cluster quality ranker to order the data sets within each cluster. In one embodiment, the data set quality repository 160 maintains the data set quality for the clustered data sets. In one embodiment, the data set quality is periodically reevaluated for each data set.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data set clustering system 170 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 8 illustrates an example machine of a computer system 800 within which a set of instructions, for causing the machine to perform any one or more of the methodologies discussed herein, can be executed. In some embodiments, the computer system 800 can correspond to a component of a networked computer system (e.g., the computer system 100 of FIG. 1) that includes, is coupled to, or utilizes a machine to execute an operating system to perform operations corresponding to the data set clustering system 170 of FIG. 1. A computer system 800 may also perform operations corresponding to the data set quality monitor 204, data set info extractor 208, data cluster quality ranker 210, and data set merger system 212, and merger interface 214 of FIG. 2.

Data set clustering system 170 and data cluster repository 160 are shown as part of instructions 812 to illustrate that at times, portions of data set clustering system 170 and/or data cluster repository 160 are executed by processing device 802. However, it is not required that data set clustering system 170 and/or data cluster repository 160 be included in instructions 812 at the same time and any portions of data set clustering system 170 and/or data cluster repository 160 are stored in other components of computer system 800 at other times, e.g., when not executed by processing device 802.

The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random-access memory (DRAM) such as synchronous DRAM (SDRAM) or Rambus DRAM (RDRAM), etc.), a memory 806 (e.g., flash memory, static random-access memory (SRAM), etc.), an input/output system 810, and a data storage system 840, which communicate with each other via a bus 830.

Data set clustering system 170 and data cluster repository 160 are shown as part of instructions 814 to illustrate that at times, portions of data set clustering system 170 and/or data cluster repository 160 can be stored in main memory 804. However, it is not required that data set clustering system 170 and/or data cluster repository 160 be included in instructions 814 at the same time and any portions of data set clustering system 170 and/or data cluster repository 160 can be stored in other components of computer system 800.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 812 for performing the operations and steps discussed herein.

The computer system 800 can further include a network interface device 808 to communicate over the network 820. Network interface device 808 can provide a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

Data set clustering system 170 and data cluster repository 160 are shown as part of instructions 844 to illustrate that at times, portions of data set clustering system 170 and/or data cluster repository 160 can be stored in data storage system 840. However, it is not required that data set clustering system 170 and/or data cluster repository 160 be included in instructions 844 at the same time and any portions of data set clustering system 170 and/or data cluster repository 160 can be stored in other components of computer system 800.

The input/output system 810 can include an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, and/or digital imagery, for example.

The data storage system 840 can include a machine-readable storage medium 842 (also known as a computer-readable medium) on which is stored one or more sets of instructions 844 or software embodying any one or more of the methodologies or functions described herein. The instructions 812, 814, 844 can also reside, completely or at least partially, within the main memory 804 and/or within the processing device 802 during execution thereof by the computer system 800, the main memory 804 and the processing device 802 also constituting machine-readable storage media.

In one embodiment, the instructions 812, 814, 844 include instructions to implement functionality corresponding to data set clustering system 170 (e.g., the data set clustering system 170 of FIG. 1). While the machine-readable storage medium 842 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. Additionally, although not illustrated in FIG. 8, instructions 812, 814, 844 may include instructions to implement the system 200 including the data set clustering system 170, and other elements of which an exemplary implementation is illustrated in FIG. 2. Additionally, instructions may include instructions to implement other aspects of computing system 100 of FIG. 1.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method of generating data validation assertions and verifying that data batches meet these data validation assertions, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

maintaining a data repository including a plurality of data sets, each data set comprising data from a data source with shared metrics;

processing a selected group of data sets of the plurality of data sets in the data repository by (i) obtaining metadata from the selected data sets; (ii) identifying upstream data sets utilized by the selected data sets; and (iii) extracting semantic features from the selected data sets;

clustering the plurality of data sets into one or more clusters based on similarity, wherein the similarity is determined based on a combination of the metadata, the upstream data sets, and the semantic features of the selected data sets;

ranking the data sets in a first cluster based on data set quality, wherein, for a data set, a data set quality ranking comprises a metadata quality rating computed using a first quality function and a data content quality rating computed using a second quality function;

storing the first cluster and ranking data for each of the selected group of data sets in a data set cluster repository; and initiating a data set merging process to remove the data set when a combination of a metadata match and a semantic match are above a similarity threshold, wherein the data set merging process is performed based on the data set quality ranking.

2. The method of claim 1 further comprising:

evaluating data set quality for the selected group of data sets, the data set quality comprising a metadata quality calculated from one or more of: arrival time, update frequency, number of columns, or raw data count.

3. The method of claim 1, further comprising:

identifying two data sets in the first cluster, the two data sets having identical upstream data sets;

comparing the metadata for the two data sets;

determining a percentage metadata match;

comparing the semantic features for the two data sets;

determining a percentage semantic match; and initiating the data set merging process when a combination of the percentage metadata match and the percentage semantic match are above a similarity threshold.

4. The method of claim 3, further comprising:

wherein a merged data set comprises a single data set including fields and data content of the two data sets that were merged.

5. The method of claim 3, further comprising:

comparing a list of field labels in the two data sets;

identifying a field having matching content and different field labels; and verifying identity between the field labels by comparing data set entries in the field.

6. The method of claim 1, wherein the metadata for a data set comprises one or more of: a number of attributes, a list of attribute names, field types, or value constraints.

7. The method of claim 1, wherein extracting the semantic features comprises extracting a representative subset of data set content.

8. The method of claim 1, further comprising:

featurizing the metadata, the upstream data sets, and the semantic features for use by the clustering.

9. The method of claim 1, wherein the clustering utilizes K-means clustering based on a combination of a plurality of the metadata, the upstream data sets, and the semantic features.

10. A method comprising:

maintaining a data repository including a plurality of data sets;

selecting a group of data sets for clustering, each data set comprising data from a data source with shared metrics;

for each of the data sets in the group of data sets: (i) obtaining metadata comprising number of attributes, a list of attribute names, field types, and value constraints, (ii) iteratively identifying upstream data sets utilized by the data set, and (iii) extracting semantic features;

clustering the group of data sets into one or more clusters based on data set similarity, the data set similarity determined based on a combination of the metadata, the semantic features, and the upstream data sets;

ranking the data sets in each cluster based on data set quality, wherein, for a data set, a data set quality ranking comprises a metadata quality rating computed using a first quality function and a data content quality rating computed using a second quality function;

storing the ranking and the clustering in a data set cluster repository;

initiating a data set merging process to remove the data set when a combination of a metadata match and a semantic match are above a similarity threshold, wherein the data set merging process is performed based on the data set quality ranking;

receiving a search query for a data set;

retrieving a first cluster responsive to the search query from the data set cluster repository; and responding to the search query with the first cluster, in ranked order.

11. A computer implemented system comprising:

a data set info extractor implemented by a processor to (i) obtain metadata from a group of data sets; (ii) identify upstream data sets utilized by the group of data sets; and (iii) extract semantic features from the group of data sets, wherein each data set comprises data from a data source with shared data metrics;

a data set clusterer to cluster the group of data sets into one or more clusters based on similarity, wherein the similarity is determined based on a combination of the metadata, the upstream data sets, and the semantic features of the group of data sets;

a data cluster quality ranker to rank the data sets in a first cluster based on data set quality, wherein, for a data set, a data set quality ranking comprises a metadata quality rating computed using a first quality function and a data content quality rating computed using a second quality function;

a data set cluster repository to store cluster data and rank data for each of the data sets;

a memory to store the cluster data and the rank data;

a data set merger system to initiate a data set merging process to remove the data set when a combination of a metadata match and a semantic match are above a similarity threshold, wherein the data set merging process is performed based on the data set quality ranking; and a user interface to receive a search query, the computer implemented system to identify a responsive cluster to the search query based on the cluster data and the rank data in memory and respond with the responsive cluster of ranked data sets.

12. The system of claim 11 further comprising:

a data set quality monitor to evaluate data set quality for the group of data sets; and a user interface to present the ranked data sets in the first cluster in response to a search query.

13. The system of claim 11, further comprising:

the data set merger system to identify two data sets in a cluster for merger, and the data set merger system to (i) compare the metadata for the two data sets and determine a percentage metadata match, (ii) compare the semantic features for the two data sets and determine a percentage semantic match, (iii) compare the upstream data sets for the two data sets and determine a percentage upstream data set match; and the data set merger system to merge the two data sets when a combination of the metadata match and the semantic match are above a similarity threshold, to reduce memory storage requirements for the group of data sets.

14. The system of claim 13, further comprising wherein a merged data set comprises a single data set including fields and data content of the two data sets that were merged.

15. The system of claim 13, wherein the data set merger system is further configured to:

compare a list of field labels in the two data sets;

identify a field having matching content and different field labels; and verify identity between the field labels by comparing data set entries in the field.

16. The system of claim 11, wherein the metadata for a data set comprises one or more of: a number of attributes, a list of attribute names, field types, or value constraints.

17. The system of claim 11, wherein extracting semantic features includes a representative subset of data set content.

18. The system of claim 11, further comprising:

featurizing the metadata, the upstream data sets, and the semantic features for use by the data set clusterer.

19. The system of claim 11, wherein the data set clusterer utilizes K-means clustering based on a combination of a plurality of the metadata, the upstream data sets, and the semantic features.

20. The system of claim 11, further comprising:

the data cluster quality ranker further to calculate the data set quality by assigning a rating to each quality element and multiplying the rating by a weight assigned to the quality element.

21. The method of claim 1, further comprising:

receiving a search query, the search query requesting one or more responsive data sets from the data repository;

identifying the first cluster responsive to the search query in the data set cluster repository; and responding to the search query with the ranked data set in the first cluster.

* * * * *